(12) United States Patent
Tang et al.

(10) Patent No.: US 9,147,906 B2
(45) Date of Patent: Sep. 29, 2015

(54) BATTERY ELECTROLYTE SOLUTIONS CONTAINING PHOSPHORUS-SULFUR COMPOUNDS

(75) Inventors: Houxiang Tang, Midland, MI (US); William J. Kruper, Jr., Sanford, MI (US); Ravi B. Shankar, Midland, MI (US); Deidre A. Strand, Midland, MI (US); Peter M. Margl, Midland, MI (US); Andrew J. Pasztor, Jr., Midland, MI (US); David R. Wilson, Midland, MI (US); Jeremy R. Stajdl, Saginaw, MI (US)

(73) Assignee: Dow Global Technologies LLC, Midland, MI (US)

( * ) Notice: Subject to any disclaimer, the term of this patent is extended or adjusted under 35 U.S.C. 154(b) by 723 days.

(21) Appl. No.: 13/503,369

(22) PCT Filed: Nov. 16, 2009

(86) PCT No.: PCT/US2009/064624
§ 371 (c)(1),
(2), (4) Date: Apr. 22, 2012

(87) PCT Pub. No.: WO2011/059458
PCT Pub. Date: May 19, 2011

(65) Prior Publication Data
US 2012/0315549 A1    Dec. 13, 2012

(51) Int. Cl.
*H01M 10/0567* (2010.01)
*H01M 6/16* (2006.01)
*H01M 10/052* (2010.01)

(52) U.S. Cl.
CPC .......... *H01M 10/0567* (2013.01); *H01M 6/168* (2013.01); *H01M 10/052* (2013.01); *H01M 2300/0025* (2013.01); *Y02E 60/122* (2013.01)

(58) Field of Classification Search
CPC ............ H01M 6/168; H01M 10/0567; H01M 10/052; H01M 2300/0025; Y02E 60/122
See application file for complete search history.

(56) References Cited

U.S. PATENT DOCUMENTS

| | | |
|---|---|---|
| 6,040,091 A | 3/2000 | Sugita |
| 7,060,392 B2 | 6/2006 | Kim |
| 7,067,219 B2 | 6/2006 | Otsuki |
| 2006/0194115 A1 | 8/2006 | DeJonghe |
| 2006/0216612 A1 | 9/2006 | Jambunathan |

FOREIGN PATENT DOCUMENTS

| | | |
|---|---|---|
| EP | 1205997 A | 5/2002 |
| JP | 10-340739 A | 12/1998 |
| JP | 2002-352804 A | 2/2006 |
| WO | 2008-088487 A | 7/2008 |

OTHER PUBLICATIONS

Zhang, "A review on electrolyte additives for lithium-ion batteries", J. Power Sources 162 (2006) 1379-1394.

*Primary Examiner* — Laura Weiner
(74) *Attorney, Agent, or Firm* — Gary C Cohn PLLC (57) ABSTRACT

A battery electrolyte solution contains from 0.001 to 20% by weight of certain phosphorus-sulfur compounds. The phosphorus-sulfur compound performs effectively as a solid-electrolyte interphase (SEI) forming material. The phosphorus-sulfur compound has little adverse impact on the electrical properties of the battery, and in some cases actually improves battery performance. Batteries containing the electrolyte solution form robust and stable SEIs even when charged at high rates during initial formation cycles.

8 Claims, 3 Drawing Sheets

BATTERY ELECTROLYTE SOLUTIONS CONTAINING PHOSPHORUS-SULFUR COMPOUNDS

The present invention relates to nonaqueous electrolyte solutions which contain phosphorus-sulfur compounds as additives.

Lithium batteries are widely used as primary and secondary batteries for vehicles and many types of electronic equipment. These batteries tend to have high energy and power densities and are favored in many applications for that reason. The electrolyte used in a lithium battery is generally a high dielectric constant solution of a lithium salt in an organic solvent or a mixture of organic solvents.

When a lithium battery is charged, certain components can decompose and react with lithium species to form a coating on the surface of the anode. This coating is known as the solid electrolyte interphase, or SEI.

A well-formed SEI is very important to battery performance. The decomposition reactions that form the SEI require a supply of electrons from the anode. If a supply of electrons continues to be available after the SEI is formed, the decomposition reactions can spread through the electrolyte solution and ruin the battery performance. Therefore, in order to protect the rest of the electrolyte, the SEI must be a good electronic insulator. At the same time, the SEI must be a good conductor of lithium ions, as the operation of the battery depends on the transport of Li ions back and forth between the anode and cathode. The SEI should not block this movement of Li ions and therefore must permit Li ions to migrate through it easily as they move from the electrolyte to the surface of the anode. Because of the important role that the SEI plays in battery performance, the initial charging process is usually carried out in such a way as to promote the formation of a stable and robust SEI.

In addition, it is common to include in the electrolyte solution additives that promote SEI formation. A number of additives of these types are described by Zhang in "A review on electrolyte additives for lithium-ion batteries", *J. Power Sources* 162 (2006) 1379-1394. Many of these additives contain vinyl groups which are capable of polymerization. Other types include sulfur-containing reducing agents such as $SO_2$, polysulfide, cyclic alkyl sulfites such as ethylene sulfite and propylene sulfite, and aryl sulfites. Radical anion scavengers are useful. These include materials such as carbon dioxide, dialkyl pyrocarbonate, carboxyl phenols, aromatic esters and anhydrides, succinimide, N-benzyloxy carbonyloxy succinimide, and various boron compounds. Another type of SEI promoter has a strong affinity to the carbon surface of the anode. Examples of these include halogenated organic compounds, polydimethylsiloxane and silane. In addition, alkali metal salts have been added in an attempt to improve SEI formation. Many of these SEI additives have significant shortcomings. Some are gasses or volatile materials that can produce a gas during charging or discharging. Others interfere with battery performance. Still others are effective only in large concentrations. Many of them require that the battery be charged somewhat slowly during the formation cycle in order to form a good SEI.

It is desirable to provide a battery electrolyte solution which forms a stable and robust SEI, which provides for good battery performance, and which allows the initial battery charge cycles to be conducted at fast rates.

Another concern with lithium batteries is that the organic electrolyte solutions can, under certain circumstances, engage in runaway exothermic reactions or even start to burn. Lithium batteries have been known to catch fire due to overcharge, overdischarge, short circuit conditions, and mechanical or thermal abuses. Other problems can occur short of burning, including a significant loss of battery life. Therefore, additives have been incorporated into the electrolyte solutions of lithium batteries to help stabilize the electrolyte. A number of phosphorus compounds have been suggested as flame retardants or "thermal runaway inhibitors" for battery electrolyte solutions. These include various phosphine oxide ($O:PR_3$), phosphinite ($P(OR)R_2$), phosphonite ($P(OR)_2R$), phosphite ($P(OR)_3$), phosphinate ($O:P(OR)R_2$), phosphonate ($O:P(OR)_2R$), phosphate ($O:P(OR)_3$) and phosphazene ($-N=PR_2-$)$_n$ compounds.

This invention is in one aspect a battery electrolyte solution comprising at least one lithium salt and a nonaqueous solvent in which the lithium salt is soluble, wherein from 0.001 to 20% of the weight of the battery electrolyte solution is at least one phosphorus-sulfur additive represented by the structure I:

wherein X is oxygen or sulfur, T is a covalent bond, oxygen or sulfur, provided that at least one of X and T is sulfur, each X' is independently oxygen or sulfur, each m is independently zero or 1 when X' is oxygen and zero, 1 or 2 when X' is sulfur, n is at least 1 and preferably at least 2, each R is independently an unsubstituted or inertly substituted hydrocarbyl group or the R groups together form an unsubstituted or inertly substituted divalent organic group and A is an organic linking group.

Phosphorus-sulfur compounds according to structure (I) have been found to be very effective SEI promoters for lithium batteries. They are effective even at low concentrations within the battery electrolyte solution. The presence of these phosphorus-sulfur compounds permits the battery to be cycled at a C-rate of as much as 10 C during the formation cycle. In addition, the phosphorus-sulfur additive has been found to have little or no adverse impact on battery performance, and may even increase battery capacity utilization, discharge rate capability and/or cycling stability of the battery.

This invention is also an electrical battery comprising an anode, a cathode, a separator disposed between the anode and cathode, and a nonaqueous battery electrolyte solution in contact with the anode and cathode, wherein the battery electrolyte solution comprises at least one lithium salt, a nonaqueous solvent in which the lithium salt is soluble, and wherein from about 0.001 to 20% by weight of the weight of the battery electrolyte solution is at least one phosphorus-sulfur compound according to structure I.

The phosphorus-sulfur additive is characterized by having at least one phosphorus-sulfur group which contains a phosphorus atom bonded to at least one and preferably at least two sulfur or oxygen atoms, provided that at least one of those atoms is a sulfur atom. The group may contain a single sulfur atom, such as moieties of the following types (structures II):

(II)

The phosphorus-sulfur group may contain two sulfur atoms bonded to the phosphorus atom, such as moieties of the following types (structures III):

(III)

The phosphorus-sulfur group may contain 3 or 4 sulfur atoms bonded to the phosphorus atom, as shown in structures IV:

(IV)

In addition, the phosphorus-sulfur group includes moieties in which the phosphorus atom is bonded directly to a carbon atom (of an A group and/or an R group, as described before) such as is shown in structures V:

(V)

-continued

Thus, certain useful types of suitable phosphorus-sulfur additives can be represented by structures VI, VII and VIII:

(VI)

(VII)

(VIII)

wherein R, X, T, A, and n are as described before, and at least one of X and T is sulfur. In structures I, VI, VII and VIII, T is preferably oxygen or sulfur, most preferably sulfur. X is preferably sulfur and n is preferably at least 2.

In structures I, VI, VII, or VIII, the R groups may be, for example, unsubstituted or inertly substituted aliphatic, cycloaliphatic or aromatic groups.

In this application, an "inert" substituent is one that does not significantly interfere with the SEI-forming properties of the additive. A compound containing only inert substituents is said to be "inertly substituted". The inert substituent may be, for example, an oxygen-containing group such as an ether, ester, carbonyl or oxirane group, and the like. An inert substituent may be a nitrogen-containing group such as a primary, secondary or tertiary amine group, an imine group, an amide group or a nitro group. The inert substituent may contain other hetero atoms such as sulfur, phosphorus and the like.

A hydrocarbyl group, for purposes of this invention, is a group that contains only hydrogen and carbon atoms. A hydrocarbyl group may be aliphatic, alicyclic, aromatic or some combination of two or more of those types.

The R groups in structures I, II, or III are preferably unsubstituted or inertly substituted lower alkyl, such as methyl, ethyl, n-propyl, isopropyl, n-butyl, isobutyl, sec-butyl, t-butyl and the like. In other preferred embodiments, the two R groups together form a divalent organic radical that completes a ring structure with the $-(X')_m-P-(X')_m-$, $-O-P-O-$, $-S-P-O-$ or $-S-P-S-$ linkage, respectively, as shown for example in structure IX below.

An especially preferred phosphorus-sulfur additive is a compound represented by structure IX:

(IX)

wherein X, n, and A are as described before (X preferably being sulfur), each $R^2$ is independently hydrogen, alkyl or inertly substituted alkyl, and $R^3$ is a covalent bond or a divalent linking group. In structure IX, the $R^2$ groups are preferably hydrogen or lower alkyl and more preferably hydrogen. $R^3$ is preferably a straight-chain or branched hydrocarbyl group, —O—, or a covalent bond. More preferred $R^3$ groups are hydrocarbyl groups that are gem-disubstituted on the carbon atom or carbon atoms that are bonded directly to the $R^2C$ groups. The $R^3$ group is most preferably dialkyl-substituted methylene, as is the case when the $R^3$ group is (dimethyl)methylene.

An especially preferred type of phosphorus-sulfur additive is represented by the structure X:

(X)

where X, n and A are as before. X is preferably sulfur.

The A group in structures I, VI, VII, VIII, IX and X is an organic linking group. The organic linking group may have a wide variety of possible structures. An organic linking group is covalently bonded to the —T— linkage (in structures I, VI, VII, and VIII) or the —S— atom (in structures IX and X). The —T— or —S— linkage may be bonded to a carbon atom or a heteroatom on the organic linking group A, but is preferably bonded to a carbon atom. That carbon atom is preferably a primary or secondary carbon atom (i.e., is bonded to no more than 2 other carbon atoms), but is less preferably a tertiary carbon atom (i.e., one bonded to three other carbon atoms).

One type of organic linking group A is an unsubstituted or inertly substituted hydrocarbyl group. The organic linking group A may contain any number of carbon atoms, although it is preferred that the molecular weight per phosphorus atom does not exceed about 1000 daltons, more preferably does not exceed about 750 daltons, and especially is below 500 daltons. The phosphorus-sulfur additive may contain from 5 to 50% or more sulfur by weight. The organic linking group A may be aliphatic (linear or branched), alicyclic, aromatic, or some combination of these. The valence of the organic linking group A is equal to n.

One preferred type of linking group A for structures I, VI, VII, VIII, IX, and X is bonded to the —T— or —S— linkage (as the case may be) through a benzylic carbon atom. Specific examples of phosphorus-sulfur additives containing this type of A group are shown in structures XI-XX, as follow:

(XI)

(XII)

(XIII)

(XIV)

(XV)

-continued

(XVI)

(XVIII)

(XVII)

(XIX)

(XX)

It is also possible for the phosphorus-sulfur groups to be bonded directly to an aromatic ring of an A group.

Additional suitable phosphorus-sulfur compounds are described in WO 08/88487, the disclosure of which is incorporated herein by reference.

The phosphorus-sulfur compound may constitute from about 0.001 to as much as 20% of the total weight of the battery electrolyte solution. The phosphorus-sulfur compound preferably constitutes no more than 5%, more preferably no more than 2%, of the total weight of the battery electrolyte solution. An especially preferred amount is up to 0.5% of the total weight of the battery electrolyte solution. A preferred lower amount is at least 0.01% of the total electrolyte solution weight, and a more preferred amount is at least 0.1%.

The other main components of the battery electrolyte solution are a lithium salt and a nonaqueous solvent for the lithium salt.

The lithium salt may be any that is suitable for battery use, including inorganic lithium salts such as $LiAsF_6$, $LiPF_6$, $LiBF_4$, $LiB(C_2O_4)_2$, $LiBF_2C_2O_4$, $LiClO_4$, $LiBrO_4$, and $LiIO_4$ and organic lithium salts such as $LiB(C_6H_5)_4$, $LiSO_3CH_3$, $LiN(SO_2C_2F_5)_2$ and $LiSO_3CF_3$. $LiPF_6$, $LiB(C_2O_4)_2$, $LiBF_2C_2O_4$, $LiBF_4$, $LiAsF_6$, and $LiN(SO_2CF_3)_2$ are preferred types, and $LiPF_6$ is an especially preferred lithium salt.

The lithium salt is suitably present in a concentration of at least 0.5 moles/liter of electrolyte solution, preferably at least 0.75 moles/liter, up to 3 moles/liter, and more preferably up to 1.5 moles/liter.

The nonaqueous solvent may include, for example, one or more linear alkyl carbonates, cyclic carbonates, cyclic esters, linear esters, cyclic ethers, alkyl ethers, nitriles, sulfones, sulfolanes, sioxanes, and sultones. Mixtures of any two or more of the foregoing types can be used. Cyclic esters, linear alkyl carbonates, and cyclic carbonates are preferred types of nonaqueous solvents.

Suitable linear alkyl carbonates include dimethyl carbonate, diethyl carbonate, methyl ethyl carbonate and the like. Cyclic carbonates that are suitable include ethylene carbonate, propylene carbonate, butylene carbonate and the like. Suitable cyclic esters include, for example, γ-butyrolactone and γ-valerolactone. Cyclic ethers include tetrahydrofuran, 2-methyltetrahydrofuran, tetrahydropyran and the like. Alkyl ethers include dimethoxyethane, diethoxyethane and the like. Nitriles include mononitriles, such as acetonitrile and propionitrile, dinitriles such as glutaronitrile, and their derivatives. Sulfones include symmetric sulfones such as dimethyl sulfone, diethyl sulfone and the like, asymmetric sulfones such as ethyl methyl sulfone, propyl methyl sulfone and the like, and derivatives of such sulfones, especially fluorinated derivatives thereof. Sulfolanes include tetramethylene sulfolane and the like.

Some preferred solvent mixtures include mixtures of a cyclic carbonate with a linear alkyl carbonate at a weight ratio of from 15:85 to 40:60; a cyclic carbonate/cyclic ester mixture at a weight ratio of from 20:80 to 60:40: a cyclic carbonate/cyclic ester/linear alkyl carbonate mixture at weight ratios of 20-48:50-78:2-20; cyclic ester/linear alkyl carbonate mixtures at a weight ratio of from 70:30 to 98:2.

Solvent mixtures of particular interest are mixtures of ethylene carbonate and propylene carbonate at a weight ratio of from 15:85 to 40:60; mixtures of ethylene carbonate and dimethyl carbonate at a weight ratio of from 15:85 to 40:60; mixtures of ethylene carbonate, propylene carbonate and dimethyl carbonate at a weight ratio of 20-48:50-78:2-20; mixtures of ethylene carbonate and ethyl methyl carbonate at a weight ratio of from 15:85 to 40:60; and mixtures of propylene carbonate and dimethyl carbonate at a weight ratio of from 15:85 to 40:60.

Various other additives may be present in the battery electrolyte solution in addition to the components already mentioned. These may include, for example, additives which promote the formation of a solid electrolyte interphase at the surface of a graphite electrode; various cathode protection agents; lithium salt stabilizers; lithium deposition improving agents; ionic solvation enhancers; corrosion inhibitors; wetting agents and viscosity reducing agents. Many additives of these types are described by Zhang in "A review on electrolyte additives for lithium-ion batteries", *J. Power Sources* 162 (2006) 1379-1394.

Suitable cathode protection agents include materials such as N,N-diethylaminotrimethylsilane and $LiB(C_2O_4)_2$. Lithium salt stabilizers include LiF, tris(2,2,2-trifluoroethyl) phosphite, 1-methyl-2-pyrrolidinone, fluorinated carbamate and hexamethylphosphoramide. Examples of lithium deposition improving agents include sulfur dioxide, polysulfides, carbon dioxide, surfactants such as tetraalkylammonium chlorides, lithium and tetraethylammonium salts of perfluorooctanesulfonate, various perfluoropolyethers and the like. Crown ethers can be suitable ionic solvation enhancers, as are various borate, boron and borole compounds. $LiB(C_2O_4)_2$ and $LiF_2C_2O_4$ are examples of aluminum corrosion inhibitors. Cyclohexane, trialkyl phosphates and certain carboxylic acid esters are useful as wetting agents and viscosity reducers. Some materials, such as $LiB(C_2O_4)_2$, can perform multiple functions in the battery electrolyte solution.

Materials that impart thermal stability and/or flame retardance may also be present in the battery electrolyte solution. Examples of these include various phosphine oxide ($O:PR_3$), phosphinite ($P(OR)R_2$), phosphonite ($P(OR)_2R$), phosphite ($P(OR)_3$), phosphinate ($O:P(OR)R_2$), phosphonate ($O:P(OR)_2 R$), phosphate ($O:P(OR)_3$) and phosphazene ($-N{=}PR_2-)_n$ compounds. One suitable flame retardant is an aromatic phosphorus compound represented by structure XXI:

(XXI)

wherein A is a radical that contains one or more aromatic rings; each R is independently an alkylene diradical which may contain 1, 2 or 3 carbon atoms and which is bonded directly to a carbon atom of an aromatic ring of the A group, each $R^1$ is independently hydrogen, halogen, OH, a hydrocarbyl group having up to 12 carbon atoms or an alkoxyl group having up to 12 carbon atoms, or the two $R^1$ groups attached to a phosphorus atom may together form a ring structure that includes the phosphorus atom; and x is at least 2.

The various other additives may together constitute up to 20%, preferably up to 10% of the total weight of the battery electrolyte solution.

The battery electrolyte solution is conveniently prepared by dissolving or dispersing the lithium salt, the phosphorus-sulfur compound and any other additives as may be used into the nonaqueous solvent. The order of mixing is in general not critical. The water content of the resulting battery electrolyte solution should be as low as possible. A water content of 50 ppm or less is desired and a more preferred water content is 30 ppm or less. The various components can be individually dried before forming the electrolyte solution, and/or the formulated electrolyte solution can be dried to remove residual water. The drying method selected should not degrade or decompose the various components of the electrolyte solution, nor promote any undesired reactions between them. Thermal methods and/or vacuum treatment can be used, as can drying agents such as molecular sieves.

A battery containing the battery electrolyte solution of the invention can be of any useful construction. A typical battery construction includes an anode and cathode, with a separator and the electrolyte solution interposed between the anode and cathode so that ions can migrate through the electrolyte solution between the anode and the cathode. The assembly is generally packaged into a case. The shape of the battery is not limited. For example, the battery may be a cylindrical type containing spirally-wound sheet electrodes and separators; the battery may be a cylindrical type having an inside-out structure that includes a combination of pellet electrodes and a separator; the battery may be a plate type containing electrodes and a separator that have been superimposed.

Suitable anode materials include, for example, carbonaceous materials such as natural or artificial graphite, carbonized pitch, carbon fibers, graphitized mesophase microspheres, furnace black, acetylene black, and various other graphitized materials. The carbonaceous materials may be bound together using a binder such as a poly(vinylidene fluoride, polytetrafluoroethylene, a styrene-butadiene copolymer, an isoprene rubber, a poly(vinyl acetate), a poly(ethyl methacrylate), polyethylene or nitrocellulose. Suitable carbonaceous anodes and methods for constructing same are described, for example, in U.S. Pat. No. 7,169,511.

Other suitable anode materials include lithium metal, lithium alloys and other lithium compounds such as a lithium titanate anode.

Suitable cathode materials include inorganic compounds such as transition metal oxides, transition metal/lithium composite oxides, lithium/transition metal composite phosphates, transition metal sulfides, metal oxides, and transition metal silicates. Examples of transition metal oxides include MnO, $V_2O_5$, $V_6O_{13}$ and $TiO_2$. Transition metal/lithium composite oxides include lithium/cobalt composite oxides whose basic composition is approximately $LiCoO_2$, lithium/nickel composite oxides whose basic composition is approximately $LiNiO_2$, and lithium/manganese composite oxides whose basic composition is approximately $LiMn2O_4$ or $LiMnO_2$. In each of these cases, part of the cobalt, nickel or manganese can be replaced with one or two metals such as Al, Ti, V, Cr, Fe, Co, Ni, Cu, Zn, Mg, Ga, or Zr. Lithium/transition metal composite phosphates include lithium iron phosphate, lithium manganese phosphate, lithium cobalt phosphate, lithium iron manganese phosphate and the like. Examples of useful metal oxides include $SnO_2$ and $SiO_2$. Examples of useful metal silicates include lithium iron orthosilicate.

The electrodes are each generally in electrical contact with or formed onto a current collector. A suitable current collector for the anode is a metal or metal alloy such as copper, a copper alloy, nickel, a nickel alloy, stainless steel and the like. Suitable current collectors for the cathode include aluminum, titanium, tantalum, alloys of two or more of these and the like.

The separator is interposed between the anode and cathode to prevent the anode and cathode from coming into contact with each other and short-circuiting. The separator is conveniently a nonconductive material. It should not be reactive with or soluble in the electrolyte solution or any of the components of the electrolyte solution under operating conditions. Polymeric separators are generally suitable. Examples of suitable polymers for forming the separator include polyethylene, polypropylene, polybutene-1, poly-3-methylpentene, poly-4-methylpentene, ethylene-propylene copolymers, polytetrafluoroethylene, polystyrene, polymethylmethacrylate, polydimethylsiloxane, polyethersulfones and the like.

The electrolyte solution must be able to permeate through the separator. For this reason, the separator is generally porous, being in the form of a porous sheet, nonwoven or woven fabric or the like. The porosity of the separator is generally 20% or higher, up to as high as 90%. A preferred porosity is from 30 to 75%. The pores are generally no larger than 0.5 microns, and are preferably up to 0.05 microns in their longest cross-sectional dimension. The separator is typically at least one micron thick, and may be up to 50 microns thick. A preferred thickness is from 5 to 30 microns.

The battery is preferably a secondary (rechargeable) lithium battery. In such a battery, the discharge reaction includes a dissolution or delithiation of lithium ions from the anode into the electrolyte solution and concurrent incorporation of lithium ions into the cathode. The charging reaction, conversely, includes an incorporation of lithium ions into the anode from the electrolyte solution. Upon charging, lithium ions are reduced on the anode side, and at the same time, lithium ions in the cathode material dissolve into the electrolyte solution.

The phosphorus-sulfur compounds are effective SEI promoters, even when present in very small concentrations in the battery electrolyte solution. An important advantage of the invention is that a robust and stable SEI often forms during the initial battery cycling, even when high charge rates are used. Initial formation cycles for lithium batteries are usually conducted at low rates, such as less than 1 C, where "C" represents the current rate which will charge or discharge the design capacity of the battery in one hour. For conventional batteries, this rate is often C/10 or lower. When the phosphorus-sulfur compounds of the invention are present in the electrolyte solution, however, it has been found that significantly faster charge/discharge rates can be used during the formation cycles, when the SEI is being formed, and that a stable and robust SEI forms even when relatively high charge/discharge rates are used. Thus for example, the initial formation cycles can be performed at rates of 1 C or higher, and often can be performed at rates of from 2 to 5 C or even higher. This significantly reduces the time required to perform the initial SEI formation. In addition, the robust and stable SEI formation in many cases leads to increased battery capacity utilization, discharge rate capability and/or cycling stability of the battery, compared to when the phosphorus-sulfur compound is absent.

The battery of the invention can be used in industrial applications such as electric vehicles, hybrid electric vehicles, plug-in hybrid electric vehicles, aerospace, e-bikes, etc. The battery of the invention is also useful for operating a large number of electrical and electronic devices, such as computers, cameras, video cameras, cell phones, PDAs, MP3 and other music players, televisions, toys, video game players, household appliances, power tools, medical devices such as pacemakers and defibrillators, among many others.

The following examples are provided to illustrate the invention, but are not intended to limit the scope thereof. All parts and percentages are by weight unless otherwise indicated.

The following phosphorus-sulfur compounds are evaluated as additives in the following examples:

Compound 1

Compound 2

Compound 3

Compound 4

EXAMPLES 1-4 AND COMPARATIVE SAMPLES A-C

A control battery electrolyte solution consisting of a 1.0 M solution of $LiPF_6$ in a 50/50 by volume mixture of ethylene carbonate and diethyl carbonate is introduced into a 2025 button cell having a $LiCoO_2$ cathode, a Mesocarbon Microbead (MCMB) graphite anode and a polyolefin separator. The cell is initially charged at a 4 C rate to form an SEI, and then discharged at the same rate, until the voltage falls to 2.5 V. The button cell is designated as Comparative Battery A. After the formation cycle is completed, 4 C discharge curves for Comparative Battery A are produced, using five 4 C cycles at ambient temperature after the formation cycle. A representative discharge curve from that testing is indicated as curve "A" in each of FIGS. 1-4. Battery cycling is done using a Maccor 4000 battery tester.

Comparative Battery B is made and tested in the same way as Comparative Battery A, except the formation cycle is performed by charging and then discharging the battery at a C/10 rate. A representative discharge curve from that testing is indicated as curve "B" in each of FIGS. 1-4.

Comparative Battery C is made and tested in the same way as Comparative Battery A, except the battery electrolyte solution contains 3% by weight vinylidene carbonate, a known SEI promoter. A representative discharge curve from that testing is indicated as curve "C" in each of FIGS. 1-4.

Battery Example 1 is made and tested in the same manner as Comparative Battery A, except that the electrolyte solution contains 3 weight percent of Compound 1. A representative discharge curve from that testing is indicated as curve 1 in FIG. 1.

Battery Example 2 is made and tested in the same manner as Comparative Battery A, except that the electrolyte solution contains 3 weight percent of Compound 2. A representative discharge curve from that testing is indicated as curve 2 in FIG. 2.

Battery Example 3 is made and tested in the same manner as Comparative Battery A, except that the electrolyte solution contains 3 weight percent of Compound 3. A representative discharge curve from that testing is indicated as curve 3 in FIG. 3.

Battery Example 4 is made and tested in the same manner as Comparative Battery A, except that the electrolyte solution contains 1.5 weight percent of Compound 1, and the initial formation charge/discharge cycle is performed at a rate of C/10. The battery was tested for 5 cycles at a 4 C charge/discharge rate after the formation cycle. A representative discharge curve from that testing is indicated as curve 4 in FIG. 4.

The discharge curves in FIGS. 1-4 illustrate the change in voltage produced by the battery as the battery is drained, with respect to the charge capacity delivered, as normalized by the total amount of electrode materials (in this case the $LiCoO_2$ cathode), or so-called "specific capacity". The desired performance is for the battery to deliver as much specific capacity as possible as the cell is drained within a specific voltage window, which in this case is from 2.5 to 4.2 volts. In FIGS. 1-4, curve A shows that the voltage produced by Comparative Battery A, which contains the control electrolyte solution without an SEI-forming additive, drops to 2.5 volts after about 50-55 mAh/g specific capacity is delivered.

Comparative Battery B performs better. Curve B shows that the voltage produced by Comparative Battery B drops to 2.5 volts after about 80 mAh/g specific capacity is delivered. This is attributed to the slower rate of initial charging, compared to Comparative Battery A, and thus illustrates the sensitivity of battery performance to initial charge rates. The better performance here, compared to Comparative Battery A, is attributed to more robust SEI formation at the lower initial charge rates.

Comparative Battery C performs similarly to Comparative Battery A, demonstrating that the presence of an SEI promoter (vinylidene carbonate) can provide better performance and permit somewhat higher initial charge rates to be used.

Figure 1:
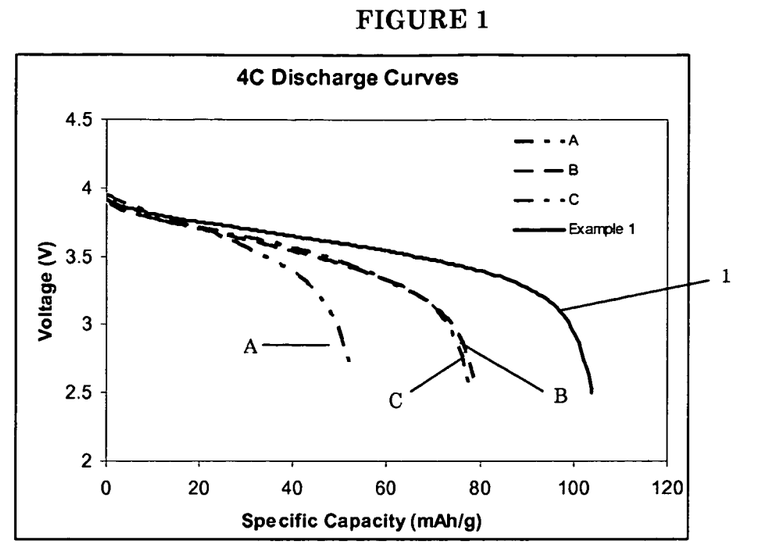
FIG. 1 is a graph of 4 C discharge curves for a battery in accordance with the invention (Ex. 1), and three comparative batteries.

Battery Example 1 performs much better on this discharge test than any of Comparative Batteries A, B and C. At the 4 C discharge rate, more that 100 mAh/g specific capacity is delivered by the battery within the voltage window. This superior performance is attributed to the formation of a highly robust and stable SEI.

Figure 2:
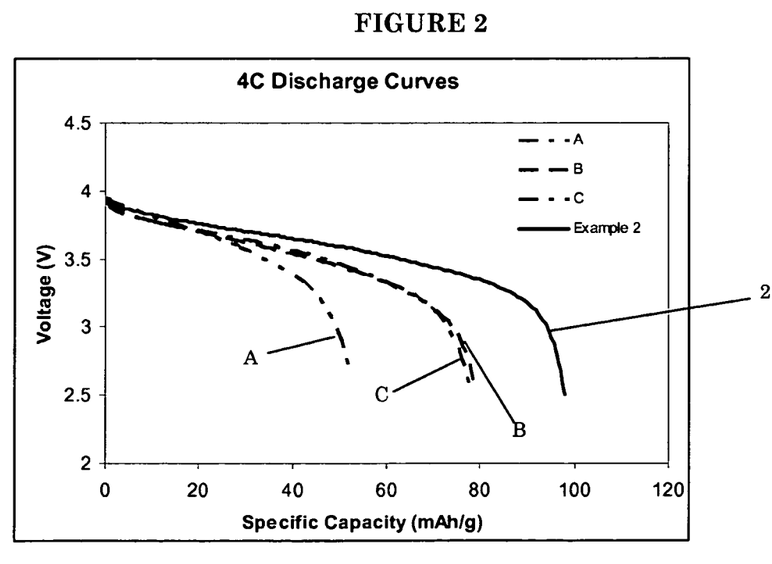
FIG. 2 is a graph of 4 C discharge curves for a battery in accordance with the invention (Ex. 2), and three comparative batteries.
Figure 3:
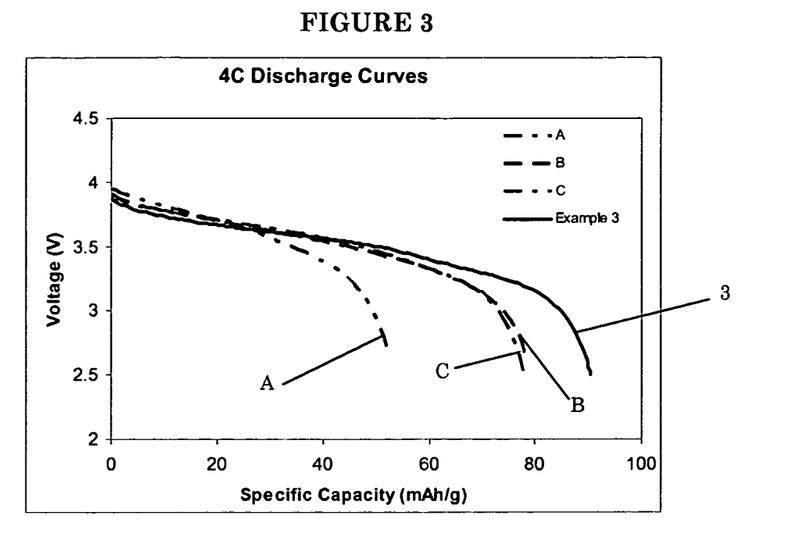
FIG. 3 is a graph of 4 C discharge curves for a battery in accordance with the invention (Ex. 3), and three comparative batteries.
Figure 4:
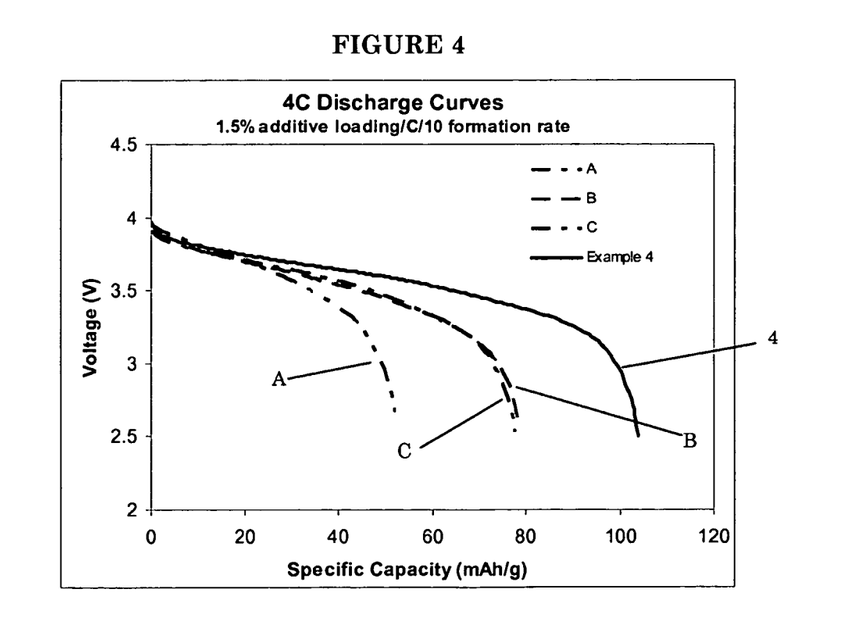
FIG. 4 is a graph of 4 C discharge curves for a battery in accordance with the invention (Ex. 4), and three comparative batteries.

Battery Example 2 performs similarly to Battery Example 1. Battery Example 3 performs only slightly worse on the discharge test than do Battery Examples 1 and 2, but significantly better than Comparative Battery A, B or C. Battery Example 3 delivers about 90 mAh/g specific capacity within the voltage window. Battery Example 4, which contains less of the SEI promoter and is charged differently, performs best of all, delivering about 110 mAh/g specific capacity within the voltage window.

EXAMPLE 5 AND COMPARATIVE BATTERIES D AND E

Battery Example 5 and Comparative Batteries D and E are made in the same general manner as described in the previous examples. Duplicate samples are made of each battery. Comparative Battery D is a control that contains the same electrolyte as Comparative Battery A. The electrolyte of Comparative Battery E further contains 5% by weight of an aromatic phosphorus compound having the structure This aromatic phosphorus compound is believed to function as a flame retardant additive.

Battery Example 5 contains 5% of the same aromatic phosphorus additive, plus 0.2% by weight of compound 4.

All of the batteries are charged initially at a C/10 charge rate and then discharged at that rate until the voltage falls to 2.5 V.

One sample of each of Battery 5 and Comparative Batteries D and E are disassembled (after initial charging) in an argon glove box. The anode is removed and packaged in a sealed bottle for surface analysis by X-ray photon spectroscopy. The analysis is performed using a Kratos Axis 165 X-ray photon spectrometer, with a monochromatic Al Kα X-ray source (1486.6 eV) at an X-ray source power of 225 Watts (14 kV, 15 mA). Survey spectra are recorded in magnetic lens mode at a pass energy of 80 eV, and high-resolution spectra are obtained at a pass energy of 40 eV. All spectra are obtained at a take-off angle of 90° with respect to the sample surface. Samples are floated independent of the spectrometer ground. Data analysis is performed using CASA XPS version 2.3.13 software.

The surface composition of the anodes from the three batteries is shown in Table 1.

TABLE 1

| Battery | Element, atom percent | | | | | | | | |
|---|---|---|---|---|---|---|---|---|---|
| | C (1s) | F (1s) | Li (1s) | O (1s) | P (2p) | S (2p) | Si (2p) | Co (2p) | Na (1s) |
| D* | 12.5 | 53.1 | 17.6 | 9.0 | 2.5 | ND | 5.3 | ND | 0.8 |
| E* | 7.7 | 49.8 | 21.5 | 12.3 | 3.5 | ND | 5.2 | ND | 0.4 |
| 5 | 22.2 | 27.6 | 14.7 | 26.7 | 8.6 | 0.2 | ND | ND | ND |

*Not an example of the invention.

ND—none determined.

The results in Table 1 indicate that the presence of the phosphorus-sulfur compound results in significant differences in the surface composition of the anode. In particular the proportions of carbon, oxygen and phosphorus all increase significantly, whereas the amount of fluorine is reduced by approximately half. The silicon detected in the anodes from Comparative Batteries D and E is attributed to contamination. This data shows that a very small amount of the phosphorus-sulfur compound has a very significant effect on SEI formation.

Other samples of each of Battery Example 5 and Comparative Batteries D and E are subjected to charge/discharge cycling at 1 C discharge/charge rates, until 100 cycles are completed. Discharge capacity retention rate with regard to the theoretical capacity loading of the battery is shown graphically in FIG. 5.

Figure 5:
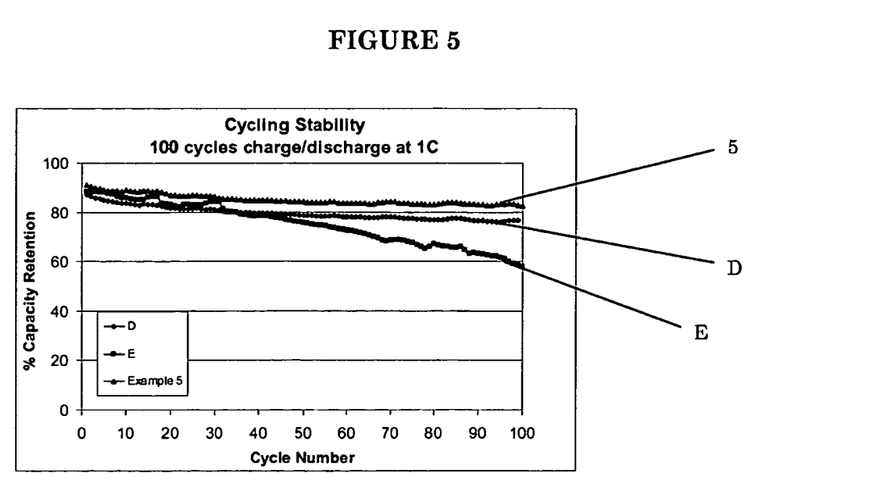
FIG. 5 is a graph illustrating the capacity retention over 100 charge/discharge cycles, for a battery of the invention (Ex. 5) and two comparative batteries.

As can be seen from FIG. 5, the control battery (Comparative Battery D) retains about 78% of its initial capacity after cycling through 100 cycles. The addition of the aromatic phosphorus compound has an adverse affect; Comparative Battery E retains only 60% of its capacity. However, Battery 5, which contains only 0.2% of the phosphorus-sulfur compound, retains about 92% of its capacity after 100 cycles, even though it also contains the aromatic phosphorus compound which hurts performance on this test.

What is claimed is:

1. A battery electrolyte solution comprising at least one lithium salt and a non-aqueous solvent in which the lithium salt is soluble, wherein from 0.001 to 20% of the weight of the battery electrolyte solution is at least one phosphorus-sulfur additive having any of the structures XI-XX:

(XI)

(XII)

(XIII)

(XIV)

(XV)

(XVI)

(XVII)

-continued (XVIII)

(XIX)

(XX)

2. The battery electrolyte solution of claim 1 wherein the solvent includes at least one material selected from linear alkyl carbonates, cyclic carbonates, esters, alkyl ethers, nitriles, sulfones, sulfolanes, siloxanes and sultones.

3. The battery electrolyte solution of claim 2 wherein the solvent includes at least one linear alkyl carbonate, at least one cyclic carbonate, or a mixture thereof.

4. The battery electrolyte solution of claim 1 wherein the lithium salt is at least one of $LiPF_6$, $LiClO_4$, $LiBF_4$, $LiAsF_6$, $LiCF_3SO_3$ and $Li[(CF_3SO_2)_2N]$.

5. The battery electrolyte solution of claim 1 which further comprises at least one other additive selected from the group consisting of a cathode protection agent, a lithium salt stabilizer, a lithium deposition improving agent, an ionic salvation enhancer, a corrosion inhibitor, a wetting agent and a viscosity reducing agent.

6. An electrical battery comprising an anode, a cathode, a separator disposed between the anode and cathode, and an electrolyte solution in contact with the anode and the cathode, wherein the electrolyte solution is a battery electrolyte solution of claim 1.

7. The electrical battery of claim 6 which is a secondary battery.

8. The electrical battery of claim 7, which is a lithium ion, lithium sulfur, lithium metal or lithium polymer battery.

* * * * *